United States Patent [19]

Yang

[11] Patent Number: 5,099,770
[45] Date of Patent: Mar. 31, 1992

[54] CONVENTIVE SMOKE FILTERING CLEANER

[76] Inventor: Shih C. Yang, 1350-1 Chun Jih Rd., Taoyuan, Taiwan

[21] Appl. No.: 712,906

[22] Filed: Jun. 7, 1991

[51] Int. Cl.$^5$ .............................. B01D 47/00
[52] U.S. Cl. ..................... 110/203; 55/223; 55/228; 55/230; 261/89; 110/215
[58] Field of Search .............. 55/228, 230, 223; 261/89; 110/203, 215

[56] References Cited

U.S. PATENT DOCUMENTS 1,786,150 12/1930 Cutler .......................... 261/89
3,760,567 9/1973 Stalker ......................... 261/89

Primary Examiner—Bernard Nozick
Attorney, Agent, or Firm—Morton J. Rosenberg; David I. Klein

[57] ABSTRACT

It is the object of the invention to present a construction for convective smoke filtering cleaners, especially for of the kind that mainly consists of a ceramic smoke filter, a drive fan, a smoke converting device, a water filter, a poison filtering device and a draw fan. Its major feature is that the ceramic smoke filter percolates the black smoke in the exhaust duct and turns it into white smoke, and then the drive fan makes white smoke quickly flow into the smoke converting device. The water supply system of the smoke converting device keeps water flowing around the wall of the exhaust duct and atomized water spraying incessantly in the duct. A rotating reservoir atomizes water and sprays over the inside wall of the duct. Consequently, when the white smoke arrives at the smoke converting device, atomized water drops can completely absorb and purify the smoke. The drifting dust and impurities in smoke along with water fluid are collected in the water filter installed under the smoke converting device. Because that a poison filtering device is built behind the water filter and a drive fan on the top of the poison filtering device consecutively operates, the gas passing through the smoke converting device is totally sucked into the poison filtering device.

1 Claim, 4 Drawing Sheets

CONVENTIVE SMOKE FILTERING CLEANER

BACKGROUND OF THE INVENTION

This invention relates to a convective smoke filtering cleaner, especially to a kind that has a concise structure, can effectively purify exhausted gas, significantly improves air contamination and can be generalized, particularly suitable for small exhausted gas release; such as industrial gas release (e.g. boiler gas release), family exhausted gas release (e.g. stove smoke in the frigid zone) and the smoke release of small trash burners. It is an apparatus that has never been seen before.

Due to prosperous industrial development, it is a fact of no doubt that the contamination of the atmosphere is getting serious. What takes the most part of the contamination is the exhausted gas from chimney stacks and trash burners. Although the release from single chimney is not very huge, it lasts for days and months. The accumulative effect is enormous. It would be natural to have serious pollution to the environment. How to protect the environment from pollution incurred industrial development become a noticeable topic. Currently we have many choices in domestic or foreign-made pollution protection equipment. Nevertheless, they are so complicated in design and expensive in price that their practicality is largely limited.

SUMMARY OF THE INVENTION

Due to the importance of air pollution protection and in order to make protection equipments more effective and more suitable for general purposes, the inventor worked out an apparatus of convective smoke filtering cleaner which is most suitable for smaller exhausted gas release and able to substantially reduce air pollution when being generally adopted.

It is the principal object of this invention to provide a convective smoke filtering cleaner construction in which the water supply system of the smoke converting device can make water fluid travel continuously around the wall of the exhaust duct and atomized water spray over the duct. In addition, a rotating reservoir constantly sprays atomized water to the inside wall of the duct. As a result, the white smoke flowing into the smoke converting device is quickly absorbed by the tiny water drops and purified.

Another object of this invention is to provide a convective smoke filtering cleaner construction in which the dust and impurities drifting along with smoke is combined with water flow and collected in the water filter built under the smoke converting device.

One more object of this invention is to provide a convective smoke filtering cleaner construction in which, by way of a poison filtering device built behind water filter and a draw fan installed at the upper end of the poison filtering device, all gas passing through the smoke converting device is to be drawn into the poison filtering device. Consequently, poisonous substance is removed, and then gas is released to the atmosphere.

The further object of this invention is to provide a convective smoke filtering cleaner construction with generous adaptability and ideality which has a concise structure, is capable of effectively purifying exhausted gas, can be generalized for the occasions with small exhaust release, and is a invention having never been seen.

DETAILED DESCRIPTION OF THE PREFERRED EMBODIMENT

Figure 1:
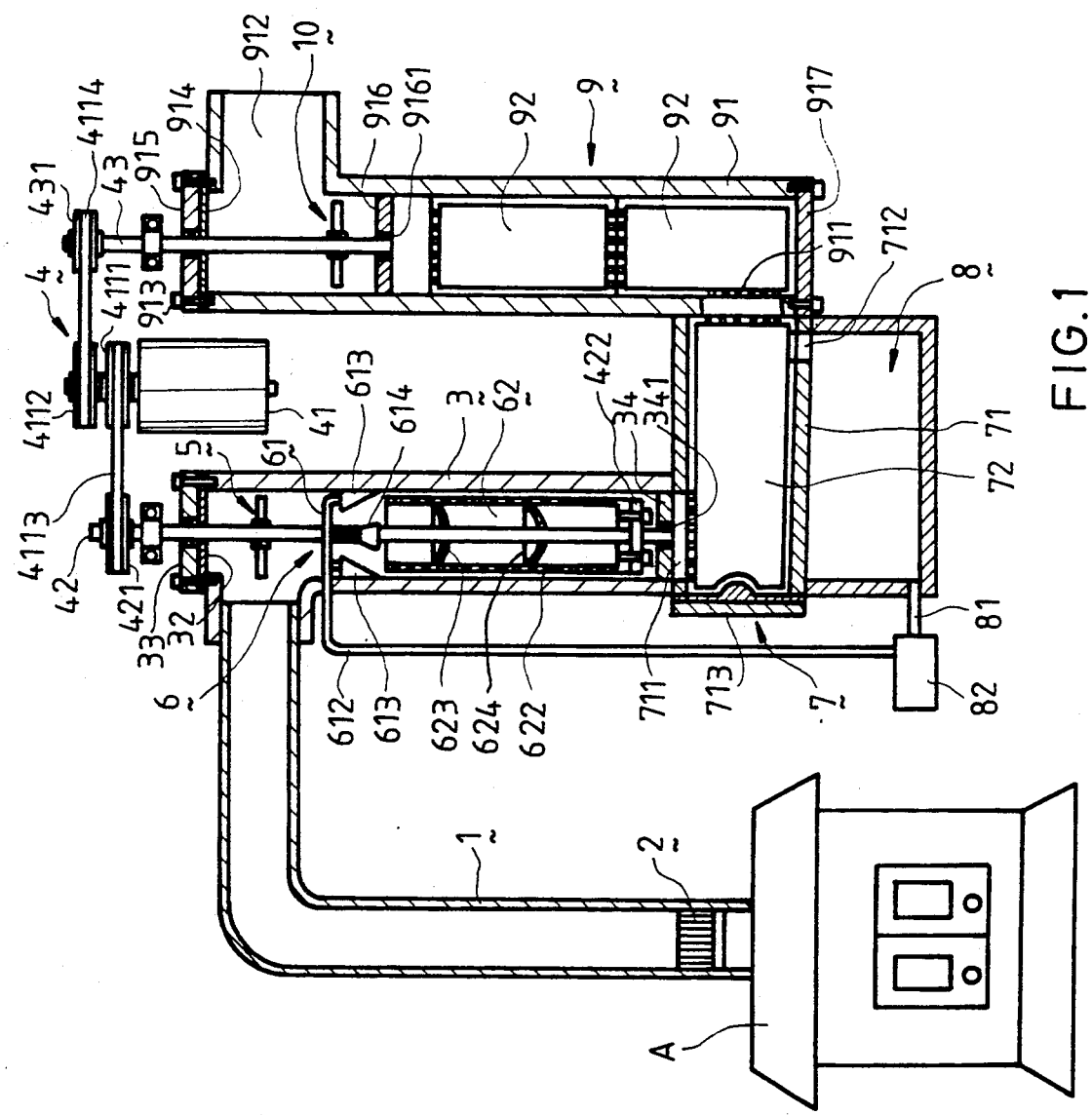
FIG. 1 is a schematic plan view illustrating essential portions of the present invention.
Figure 2:
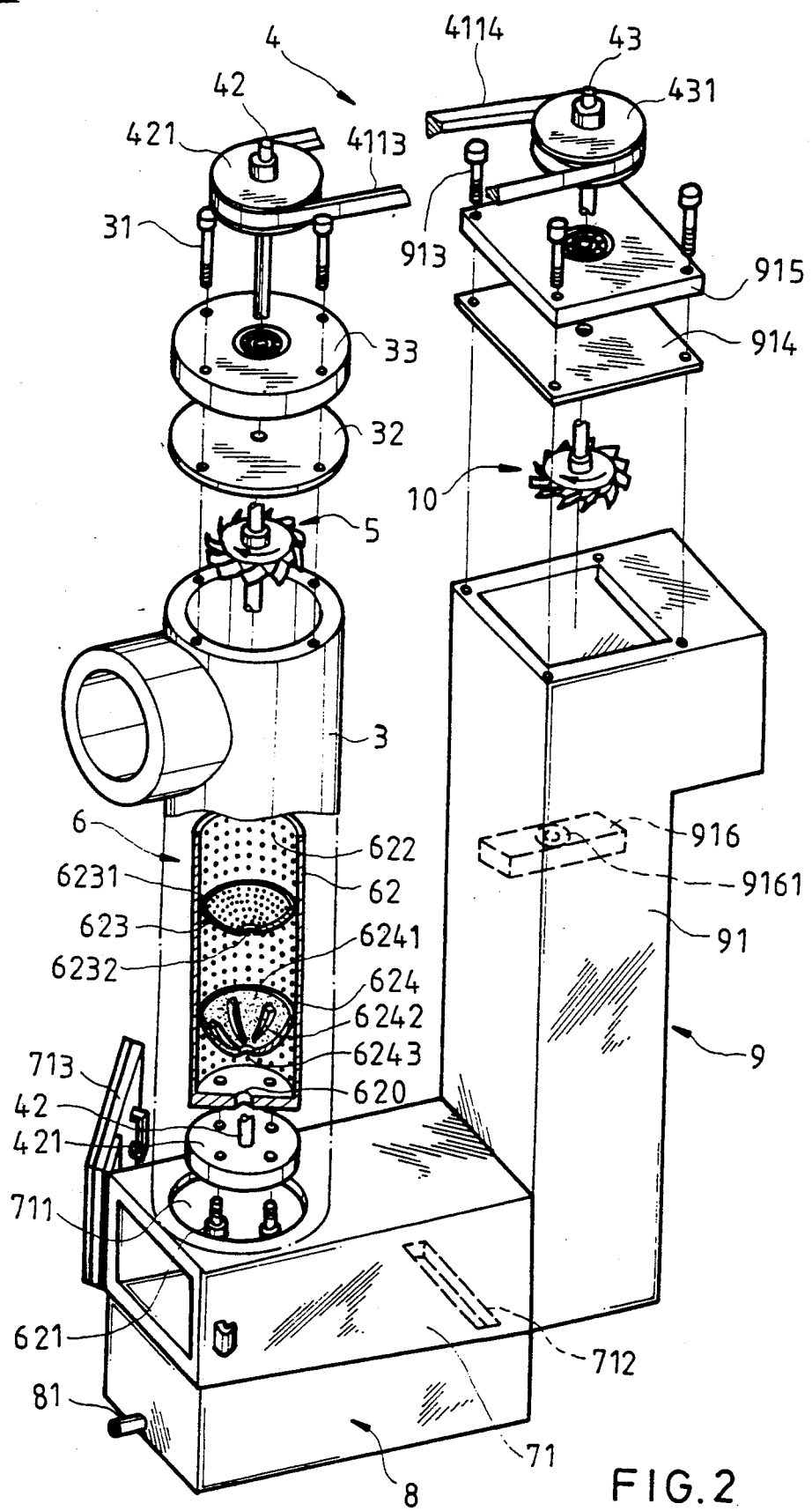
FIG. 2 is a exploded perspective view of the present invention.

Referring to FIGS. 1 to 4, the invention is a convective smoke filtering apparatus which contains the first exhaust duct 1. The front end of the first exhaust duct 1 connects with the burner A, which has small gas release like trash burners, boilers, or stoves. A ceramic smoke filter 2 is installed in the interior of the duct 1. The black smoke released from the burner A is percolated by the smoke filter 2 and turns into white smoke. Such a ceramic smoke filter is popular in application. The higher the burning temperature, the better its effect is. We don't detail its structure here. The second exhaust duct 3 is installed perpendicular to the ground. One side of its upper end is connected with the rear end of the first exhaust duct 1. Bolts 31 hold a leakproof cushion 32 and a cover plate 33 on the top of the duct 3. A properly wide locating plate 34 shown in FIG. 2 is attached to the bottom. A locating bearing 341 is in the central area of the locating plate 34. A driving device 4 comprises of a drive motor 41, two belt pulleys 4111, 4112 mounting on the shaft 411, two transmission belts 4113, 4114 transmitting power to the belt pulleys 421, 431 mounting on the shafts 42, 43 respectively. The driving shaft 42 is in cross shape and located in the center of the second exhaust duct 3.

Figure 3:
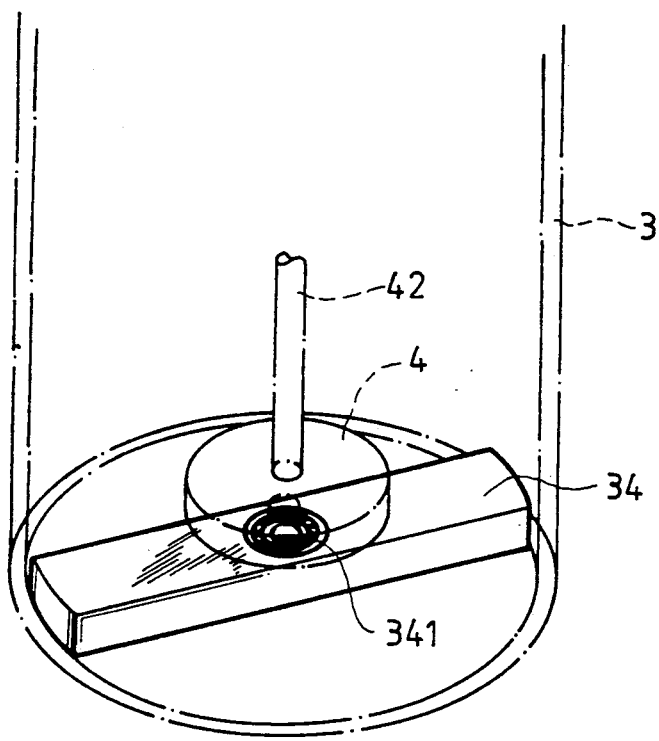
FIG. 3 is a perspective view showing the location plate installed in the second exhaust duct.
Figure 4:
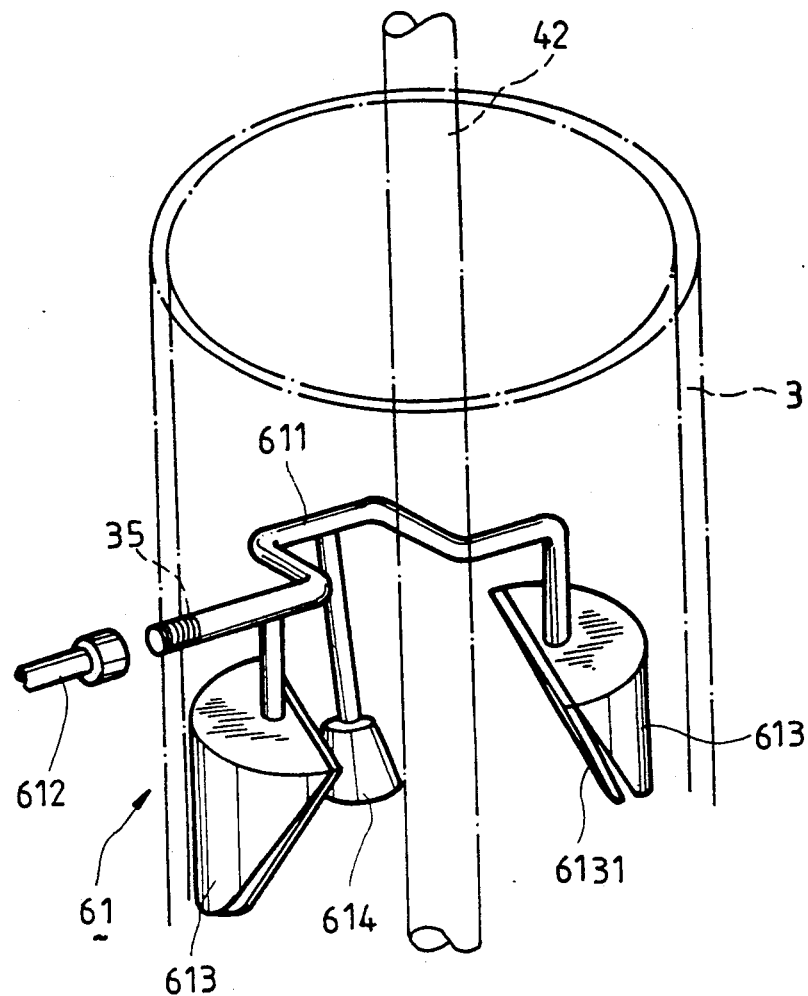
FIG. 4 is a perspective view showing the arrangement of the water supply system in the smoke converting device.
Figure 4:
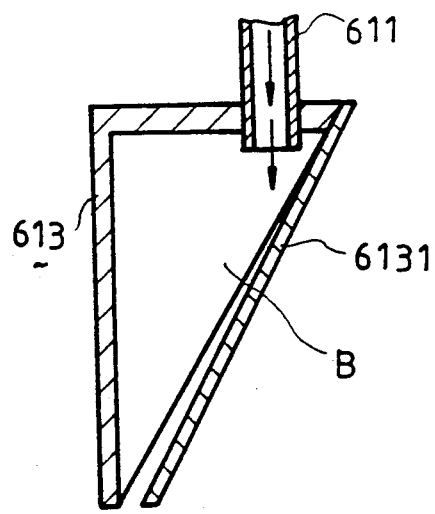

Referring to FIG. 3, the upper end of the driving shaft 42 pierces the centers of the leakproof cushion 32 and the cover plate 33. The lower end with a stop block 422 stands directly on the locating bearing 341 on the locating plate 34.

The drive fan 5, mounting on the shaft 42 of the driving device 4 and locating near the joint of the second exhaust duct 3 and the first exhaust duct 1, accelerates white smoke in the first exhaust duct 1 flowing into the second exhaust duct 3.

The smoke converting device 6, installed in the second exhaust duct 3 and under the drive fan 5, comprises a water supply system 61 and a reservoir 62. The water supply system 61 (shown in FIG. 4) having a water conduit 611 with threads at the front end passes through the porthole 35 and connects with a water supply pipe 612. At the ends of the water conduit 611 near the wall of the second exhaust duct 3 are semiconical water supply heads 613 having hollow compartments B for accommodating water fluid. The slant surface is made of a spring plate 6131 fixed at the upper end, closing the compartment B. As the compartment B is filled with water, the spring plate 6131 will be lifted up by water pressure and water fluid flows sectorially over the wall of the second exhaust duct 3.

Besides, a water spray nozzle 614 looking like a bath shower sprayer is in the position between two water supply heads 613, which sprays atomized water downward and fills the whole space of the second exhaust duct 3. The reservoir 62 is a cylindrical installation with a through hole 620 on its bottom, allowing the passage of the drive shaft 42 of the driving device 4. This reservoir 62 is secured by bolts 621 on the stop block 422 mounting the drive shaft 42. Many water holes 622 on the wall are made. Inside the cylinder there is a water tray 623 near the upper end. Many ventholes 6231 are made on the tray surface. A through hole 6232 at the tray center is made to allow the passage of the drive shaft 42. A water bowl 624 is placed near the lower end of the cylinder. Many tiny holes 6241 of small diameter and a few partition plates 6242 are placed on bowl surface. A hole 6243 located at the bowl center is used for accommodating the drive shaft 42 so that as the water spray nozzle 614 in the water supply system 61 sprays downwards, the reservoir 62 can rotate along with the drive shaft 42.

When the water tray 623 holds water fluid flowing from the water spray nozzle 614, water fluid sprays downwards via water holes 6231 and splashes out through holes 622 on the surrounding wall. In the meantime, the water bowl 624 with smaller water holes 6241 makes water drops thinner and finer. The water bowl 624 can hold more water fluid than the water tray 623. The water fluid in the bowl 624 doesn't only keep on spraying downward and splashes but through water holes 622 but also rotgates wavily. In other words, combining the operations of the water supply system 61 and the reservoir 62, the water fluid flowing around the wall of the second exhaust duct 3, the atomized water drops floating in the air and the wavy water flow in the water bowl 624 can effectively absorb, solve the white smoke and then converts it.

A water filter 7 having a container 71 is installed under the second exhaust duct 3. There is a water hole 711 on the top of the container 71, opposing to the lower end of the second duct 3. The bottom of the container 71 is backward obliqued with a water slot at its rear end. The front and rear ends remains open. A door 713 is installed at the front. A filter core 72 is placed in the container 71, similar to the filter core of a waer filter; containing active carbon, filter fabric, resin and etc. The filter core 72, accessible from the front door 713, can filter the drifting dust and impurities in smoke as well as water fluid flowing from the smoke converting device 6. A water collection tank 8 installed under the container 71 of the water filter 7 collects water fluid flowing out the water slot 712. A water conduit 81 connects with one side of the lower end of the water collection tank 8. Water in the tank can be transported to the water supply system 612 of the smoke converting device 6 by a water pump 82.

A poison filtering device 9 installed behind the water filter 8 contains a receptacle 91. A venthole 911 is on one side of the lower end of the receptacle 91, opposing to the rear end of the container 71 of the water filter 7. Another venthole 912 is on one side of the upper end. A leakproof cushion 914 and a cover plate 915 are secured on the top by bolts 913. A locating plate 916 is in a proper position near the upper end with a locating bearing 9161 at its center. The other drive shaft 43 of the driving device 4 exactly goes through the central holes of the cover plate 914 and the leakproof cushion 913 and ends at the center of the locating bearing 9161.

At least one poison filter 92 is placed in the receptacle, supporting or access by a cover plate 917 at the bottom. The installation and material of the poison filter 92 is similar to the gas masks of the commercial type. We don't detail it here. A draw fan mounted on the drive shaft 43 of the driving device 4 is exactly inside the receptacle 91 and runs continuously so that only the gas having been filtered can be released to the atmosphere.

By means of the incorporation of the aforesaid part functions, when the drive motor 41 of the driving device 4 is running the drive fan 5 mounting the shaft 43 is in rotation as well. Hence the white smoke passing through the ceramic smoke filtering device can be quickly sent to tghe second exhaust duct 3. Similarly, when the reservoir 62 in the smoke converting device 6 rotates synchronously, it can continue to stretch and fine the water drops splashed from the water supply system 61 and, in accordance with the operation of the water supply system 61, conducts water fluid flowing around the wall of the second exhaust duct 3. In addition, water fluid wavily rotates in the water bowl 6241. Naturally the white smoke arriving at the second duct 3 can be quickly, effectively absorbed by water fluid. Furthermore, because of the arrangement of the water filter 7 being installed behind the smoke converting device 6, the drifting dust and impurities in smoke will be collected along with water fluid in the filter core 72.

Purified water fluid is saved in water collection tank 8 and sent to the water supply system 61 in the smoke converting device 6 via a water pump 82. Once again because that the poison filtering device 9 is installed behind the water filter 7 and the draw fan 10 mounted on the other drive shaft 43 of the driving device 4 is in the receptacle 91 of the poison filtering device 9 and consecutively running, it is assured that waste gas passing through the smoke converting device 6 will flow into and be filtered in the poison filter 92. It would be natural that the contamination of the released gas can be significantly reduced.

I claim:

1. A construction of a convective smoke filtering cleaner, comprising mainly a first exhaust duct, a ceramic smoke filter, a second exhaust duct, a driving device, a drive fan, a smoke converting device, a water filter, a reservoir, a poison filtering device, and a draw fan, in which the front end of the first exhaust duct connects with a burner; wherein the ceramic smoke filter is built, so that the black smoke released from the burner can be percolated and turned into white smoke; characterized in that:

the second exhaust duct is built perpendicular to the ground, wherein the upper end connects with the rear end of the first exhaust duct, a leakproof cushion and a cover plate are secured on the top and a locating plate placed on the bottom with a locating bearing at the center of the plate;

the driving device comprises of a drive motor and two drive shafts, the shfts keep synchronous motion with the shaft of the drive motor via belt pulleys and transmission belts, one of the drive shafts is in cross shape and is installed right at the center of the second exhaust duct, in which the upper end goes through the leakproof cushion and the cover plate with a stop block near the upper end, the lower end is held by the locating bearing of the locating plate, the other shaft is installed in the poison filtering device, the drive fan is mounted on one of the drive shafts of the driving device and is in the right position near the upper end of the second exhaust duct so that the white smoke in the first exhaust duct will be accelerated flowing into the second exhaust duct;

the smoke converting device is installed in the second exhaust duct and is right under the drive fan, comprising a water supply system and a reservoir; in which the water supply system is equipped with a water conduit with threads at the front end, through the porthole on the second exhaust duct wall, the water conduit is connected with a water supply pipe, at the ends of the water conduit neat the wall are semiconical water supply heads, the water supply head is a hollow compartment, capable of accommodating water fluid, with a slant surface made of a spring plate, the spring plate fixed at the upper end closes the water supply head tightly when the compartment is empty, as the compartment is filled with water, the spring plate will be lifted up and water fluid flows sectorially over the second exhaust duct wall, a water spray nozzle looking like a bath shower sprayer is in the position between two water supply head, which sprays atomized water downward and fills the whole space of the second exhaust duct, the reservoir is a cylindrical installation with a hole at the bottom, through the hole, the drive shaft of the driving device is fixed on the stop block, many water holes scatter over the cylinder wall, near the interior upper end is a water tray with many ventholes on its surface, the water tray has a hole at its center, which is used for accommodating the drive shaft, in addition, a water bowl is installed near the lower end of the cylinder, there are many holes of small diameters and a few partition plates on the surface of the water bowl other than a throughhole at the center for the drive shaft of the driving device, as the water spray nozzle in the water supply system sprays water fluid downwards, the reservoir stretches and fines water drops by its rotation;

the water filter having a container is installed at the bottom of the second exhaust duct, a water hole on the top of the container opposes to the bottom of the second exhaust duct, the bottom of the container is oblique backwards with a water slot at the rear end, the front and rear end surfaces are open and a door is installed at the front end; a filter core dwells in the container so that the dust and impurities in smoke can be separated out and water fluid filtered;

the water collection tank is installed under the bottom of the water filter to collect filtered water fluid, at the bottom of the tank is a water conduit, the water in the tank can be sent to the water supply system in the smoke converting device via a water pump;

a poison filtering device with a receptacle is installed behind the water filter, one side of the lower end of the receptacle has a hole opposing to the rear end of the container of the water filter, a leakproof cushion and a cover plate are secured on the top of the receptacle, a locating plate is built at a proper position near the upper end with a locating bearing at its center so that the other drive shaft of the driving device can go through the cover plate, the leakproof cushion with the other end held at the locating bearing, there is at least one poison filter in the receptacle, a cover plate at the bottom of the receptacle is used for supporting or approaching the filter;

a draw fan is mounted on the drive shaft of the, driving device and is in the interior of the receptacle, it may continuously draw off waste gas;

by means of the incorporation of the aforesaid mechanism motion, it constitutes an apparatus of a convective smoke filtering cleaner suitable for small exhausted gas release.

* * * * *